US010995892B2

(12) United States Patent
Tiberghien et al.

(10) Patent No.: US 10,995,892 B2
(45) Date of Patent: May 4, 2021

(54) FEMALE FLUID CONNECTION ELEMENT, CONNECTION SUBASSEMBLY AND CONNECTION COMPRISING SUCH A FEMALE ELEMENT

(71) Applicant: STAUBLI FAVERGES, Faverges-Seythenex (FR)

(72) Inventors: Alain-Christophe Tiberghien, Sevrier (FR); Christophe Durieux, Gilly sur Isere (FR); Serafim Marques-Barroca, Frontenex (FR)

(73) Assignee: STAUBLI FA VERGES, Faverges-Seythenex (FR)

( * ) Notice: Subject to any disclaimer, the term of this patent is extended or adjusted under 35 U.S.C. 154(b) by 0 days.

(21) Appl. No.: 16/877,590

(22) Filed: May 19, 2020

(65) Prior Publication Data
US 2020/0370697 A1 Nov. 26, 2020

(30) Foreign Application Priority Data

May 20, 2019 (FR) ...................................... 1905263

(51) Int. Cl.
*F16L 37/40* (2006.01)
*F16L 37/32* (2006.01)

(52) U.S. Cl.
CPC .............. *F16L 37/40* (2013.01); *F16L 37/32* (2013.01); *Y10T 137/87949* (2015.04)

(58) Field of Classification Search
CPC ... F16L 37/40; F16L 37/32; Y10T 137/87949; Y10T 137/87957

(Continued)

(56) References Cited

U.S. PATENT DOCUMENTS

| 4,989,630 A | 5/1991 | Yonezwa |
| 5,123,446 A * | 6/1992 | Haunhorst et al. ..... F16L 37/23 |
| | | 137/614 |

(Continued)

FOREIGN PATENT DOCUMENTS

| DE | 19505861 A1 | 9/1995 |
| EP | 1949987 A2 | 7/2008 |
| EP | 2151309 A1 | 2/2010 |

OTHER PUBLICATIONS

France Search Report dated Jan. 8, 2020, for France Patent Application FR 1905263 filed May 20, 2019.

*Primary Examiner* — Kevin L Lee

(57) ABSTRACT

A coupler (R) female element (4) able to be coupled with a male element (2) for the removable fluid junction of two pipes. The female element body (20) centered on a first longitudinal central axis (X20) with an inner volume (V20) for receiving the male element. Additionally, the female element has a central plunger (44) longitudinally secured to the body and positioned within the inner volume, with a slide valve (46) movable within the inner volume around the central plunger between a forward closing position, in which the slide valve (46) cooperates tightly with the body (20) and the central plunger (44), and a withdrawn open position. The female element body (20) including an outer flange ring (22) positioned around the inner volume and having an outer radial surface. The outer flange ring has at least two passages (32), each passage being arranged through the outer flange ring and linking the outer radial surface and the inner volume.

15 Claims, 6 Drawing Sheets

(58) Field of Classification Search
USPC .................................. 137/614.03, 614.04
See application file for complete search history.

(56) References Cited

U.S. PATENT DOCUMENTS

| | | | | |
|---|---|---|---|---|
| 5,462,084 | A | 10/1995 | Arisato | |
| 8,973,896 | B2 * | 3/2015 | Tiberghien et al. .... | F16L 37/32 251/149.6 |
| 9,032,997 | B2 * | 5/2015 | Abura et al. ............ | F16L 37/34 137/614.02 |
| 2004/0079423 | A1 * | 4/2004 | Mikiya et al. .......... | F16L 37/34 137/614.03 |

* cited by examiner

FEMALE FLUID CONNECTION ELEMENT, CONNECTION SUBASSEMBLY AND CONNECTION COMPRISING SUCH A FEMALE ELEMENT

BACKGROUND OF THE INVENTION

The invention relates to a female fluid connection element making it possible to form, with a male element, a coupler allowing the removable junction of circulation pipes for a fluid, the pipes potentially having alignment flaws.

In general, injection molds, in particular for injection of plastic, include at least two parts, one of these parts being a stationary mold and the other part comprising a moving slide. The two mold parts are generally not perfectly aligned. These molds include cooling circuits in which a cooling fluid circulates and which communicate in the injection phase. These circuits therefore need to be coupled and uncoupled in each plastic injection cycle. It is further necessary to guarantee the absence of leak of the cooling fluid in the coupled configuration and in the uncoupled configuration, since drippings can migrate toward the injection surfaces of the mold in contact with the injected material and harm the quality of the injected part.

It is known to use a flexible hose, which remains connected at all times to the cooling circuits of the two parts of the mold and which accommodates the movements and alignment flaws of the mold parts. However, the flexible hoses wear out quickly and must be changed regularly to avoid accidental leaks, which is expensive in terms of maintenance.

It is known from U.S. Pat. No. 3,508,580 to propose a so-called "quick" coupler allowing a rapid connection and disconnection accommodating limited alignment flaws between two connection elements, while making one of the elements of the coupler float within a frame. The floating coupler element is then complementary with a valve. However, during uncoupling, drippings remain on the outer surfaces of the connection elements, these surfaces also being radially exposed to the outside, and the drippings can migrate toward the injection surfaces of the mold.

BRIEF SUMMARY OF THE INVENTION

The invention more particularly aims to address these problems, by proposing a coupler with protection against drippings and which is further easy to maintain.

To that end, the invention relates to a female connection element able to be coupled with a male element for the removable fluid junction of two pipes. The female element comprises a body centered on a first longitudinal central axis and which defines an inner volume for receiving the male element, a front side and a rear side. The female element further comprises a central plunger longitudinally secured to the body and positioned within the inner volume, as well as a slide valve movable within the inner volume around the central plunger, between a forward closing position, in which the slide valve cooperates tightly with the body and the central plunger, and a withdrawn open position.

According to the invention, the body forms an outer flange ring positioned around the inner volume and has an outer radial surface, a front axial face and a rear axial face. The front axial face and the rear axial face are parallel and annular and protrude radially from the rest of the body. The outer flange ring comprises at least two passages, each passage being arranged through the outer flange ring and coupling the outer radial surface and the inner volume. A distal sealing gasket is housed in the body at an inner radial surface of the body, which delimits the inner volume. A front face of the slide valve in the closed position and the distal sealing gasket are positioned longitudinally on either side of the passages, while the distal sealing gasket is located in front of the passages.

Owing to the invention, during the uncoupling of the female element and the male element, it is possible to discharge the coolant drippings contained in the inner volume, in front of the slide valve, through the outer flange ring, toward the outside such that the drippings cannot migrate toward the injection surfaces of the molds whereas for the coupling, the outer flange ring is suitable for being mounted with the possibility of travel perpendicular to the first central axis in order to adapt to the alignment flaws of the pipes to be joined. The passages arranged in the outer flange ring allow a flow of compressed air to pass, which drives the coolant drippings from the outer surfaces of the male element, before it is removed from the inner volume of the flange ring. The distal gasket ensures the sealing between the inner volume and the male element when the male element cooperates with the female element, avoiding the diffusion of coolant drippings outside the inner receiving volume. Furthermore, the distal gasket performs a function of scraping the outer radial surface of the male element when the latter is removed from the inner volume of the flange ring, during the uncoupling of the male and female elements of the coupler.

According to advantageous but optional aspects of the invention, such a female element may incorporate one or more of the following features, considered in any technically allowable combination:

the female element further comprises a front sealing gasket housed on the front axial face and a rear sealing gasket housed on the rear axial face, the front sealing gasket and the rear sealing gasket being centered on the first central axis;

a median plane of a distal groove housing the distal sealing gasket is positioned longitudinally between the front axial face and the rear axial face of the flange ring;

each passage comprises an outer volume that emerges on the outer radial surface of the flange ring, as well as a volume of reduced section relative to the outer volume, the volume of reduced section being inner relative to the outer volume;

in section in a plane orthogonal to the first central axis, the walls delimiting the volume of reduced section are flared and diverge toward the inner volume;

the flange ring comprises two passages that are distributed at 180° about the first central axis and each volume of reduced section covers an angular sector of 45° to 100° about the first central axis;

a width of reduced section taken along the first central axis is at least two times smaller than an orthoradial dimension of the volume of reduced section;

a proximal sealing gasket is housed in the body in a proximal groove emerging on an inner radial surface portion of equal diameter to an inner radial surface portion on which a distal groove emerges in which the distal sealing gasket is housed and, in the closed position of the slide valve, the proximal sealing gasket is radially interposed between the slide valve and the body;

the body delimits an annular volume by which each passage emerges in the inner volume, a diameter of the annular volume being greater than the diameter of an inner radial surface portion on which a distal groove emerges in which the distal sealing gasket is housed;

the female element comprises an obstacle, blocked in rotation relative to the body about the first central axis and extending radially from the outer radial surface of the flange ring;

an axial distance between a median plane of a groove housing the distal sealing gasket and the front face of the slide valve in the closed position is between 8 mm and 40 mm; and the central plunger has a planar front face and the front face of the slide valve and the front face of the plunger are flush when the slide valve is in the forward closed position.

The invention also relates to a connection subassembly, which comprises a frame and a female element as mentioned above, wherein the frame delimits an inner duct and an inner housing, the inner housing defining a second longitudinal central axis parallel to the first central axis, the female element being mounted in the inner housing of the frame with the possibility of movement of the body and the frame radially with respect to the second central axis, with the front axial face of the outer flange ring in tight sliding contact with the frame and the rear axial face of the outer flange ring in tight sliding contact with the frame, while the inner duct of the frame communicates with the inner volume of the female element, the frame delimiting at least two orifices emerging in the inner housing across from the outer flange ring in a direction radial to the second central axis.

This subassembly makes it possible to perform an effective cleaning function of a male element complementary to the female element.

According to other advantageous, but optional aspects of the invention, such a connection subassembly may incorporate one or more of the following features, considered in any technically allowable combination:

one of the orifices is connected to a pressurized air source;

the obstacle of the female element cooperates with the frame in a circumferential direction with respect to the first central axis in order to block the rotation of the body relative to the frame in a configuration where each of the orifices is across, in a radial direction, from at least one of the passages.

The invention further relates to a coupler that comprises a female element as mentioned above and a male element that, in the coupled configuration of the coupler, is introduced into the inner volume of the body. An annular front face of the male body pushes the slide valve back into the withdrawn open position, while the distal sealing gasket is in contact with an outer radial surface of the male element in an intermediate uncoupling configuration in which the slide valve is in the forward closed position.

This coupler has the same advantages as the female element of the invention.

BRIEF DESCRIPTION OF THE DRAWINGS

The invention will be better understood, and other advantages thereof will appear more clearly, in light of the following description of two embodiments of a female element, a connection subassembly, a coupler according to its principle, provided solely as an example and done in reference to the drawings, in which.

DETAILED DESCRIPTION OF THE INVENTION

Figure 1:
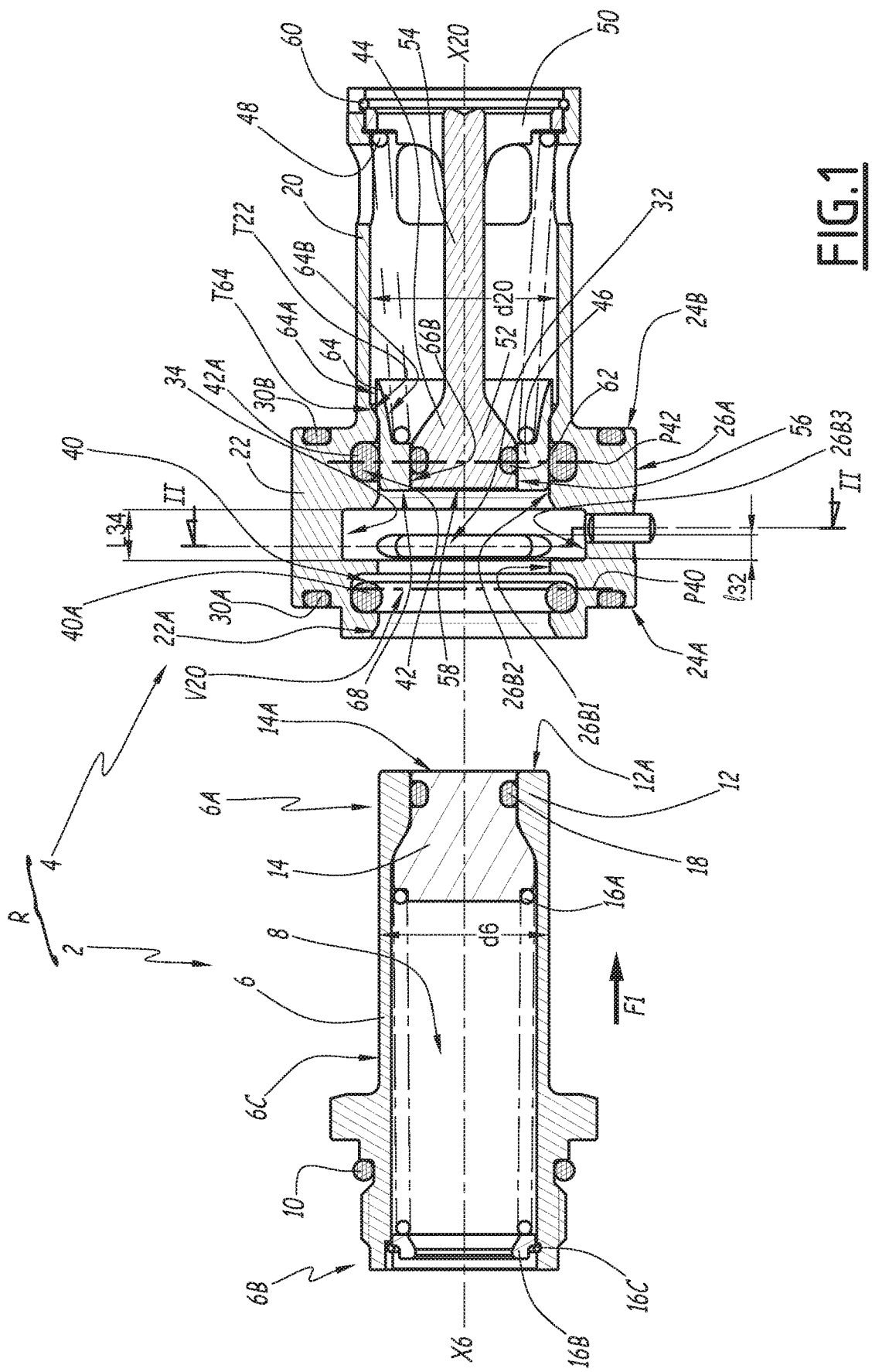
FIG. 1 is a longitudinal sectional view of a coupler according to a first embodiment of the invention and comprising a female element, which in turn is according to the first embodiment of the invention, and a male element, in an uncoupled configuration.

FIG. 1 shows a coupler R of the fluid type.

The coupler R comprises a male element 2 and a female element 4 according to a first embodiment of the invention. The male element 2 is complementary to the female element 4.

The male element 2 comprises a body 6, which has a shape of revolution centered on a longitudinal axis X6 and defines an inner pipe 8, a front end 6A, a rear end 6B and an outer radial surface 6C of the front end 6A, the outer diameter of which is denoted d6. The outer radial surface 6C is a cylinder of circular section centered on the longitudinal axis X6, that is to say, the outer radial surface 6C has a constant outer diameter d6.

In this respect, a longitudinal or axial direction is defined as extending along the central longitudinal axis of the element in question, that is to say, horizontal in FIGS. 1 and 3 to 6. A direction radial to an axis is defined as being orthogonal to this axis, a plane radial to an axis as being a plane containing this axis and extending in a radial direction, a plane orthoradial to an axis is a plane orthogonal to a plane radial to this axis and not intersecting this axis, and a direction orthoradial to an axis is a direction orthogonal to a plane radial to this axis and not intersecting this axis. A direction circumferential to an axis is defined as being oriented in a direction corresponding to a rotation about this axis. For each considered element, the term "inner" means "facing toward the central longitudinal axis", while the term "outer" means "facing away from the central longitudinal axis".

For greater clarity, the front side of a male element, respectively of a female element, is defined as the side of this male element, respectively of this female element, oriented in the longitudinal direction in the sense of the fitting or coupling, that is to say, oriented toward the female element, respectively toward the male element, at the very beginning of the fitting. The front side of the female element 4 is oriented toward the left in FIG. 1, while the front side of the male element 2 is oriented toward the right in FIG. 1. Conversely, the rear side of a male element, respectively of a female element, is defined as the longitudinal direction opposite the female element, respectively the male element.

Thus, in the example of FIGS. 1 and 3 to 6, the front of the male element 2 is situated to the right of this male element, while the front of the female element 4 is situated to the left of this female element.

The rear end 6B of the male element 2 is threaded and is designed to be screwed on a plate, with insertion of a sealing gasket 10.

The front end 6A delimits a seat 12 and has an annular front face 12A. The male element 2 further comprises a valve 14 and a return spring 16A. The valve 14 has a front face 14A. The return spring 16A and the valve 14 are housed in the inner pipe 8, the return spring 16A bearing, on the front side, on the valve 14 while, on the rear side, the return spring 16A bears on a ring 16B, which in turn is immobilized in the body 6 by a stop segment 16C. The return spring 16A, which is kept compressed in the inner pipe 8, returns the valve 14 to abut forwardly against the seat 12 of the body 6. A sealing gasket 18 is housed in the valve 14 and ensures the tightness between the valve 14 and the seat 12 in the bearing configuration of the valve 14 against the seat 12, which corresponds, for the valve 14 of the male element 2, to a so-called closed position.

In the closed position, the front face 14A of the valve 14 is advantageously flush with the annular front face 12A of the seat 12.

The female element 4 comprises a body 20 of revolution centered on a first longitudinal central axis X20.

The body 20 defines an inner volume V20 and comprises an outer flange ring 22, which is monobloc with the rest of the body 20. The outer flange ring 22 has a front axial face 24A, a rear axial face 24B, an outer radial surface 26A and a stepped inner radial surface 26B made up of three annular inner radial surface portions, namely a front inner radial surface portion 26B1 and a rear inner radial surface portion 26B2 delimiting the inner volume V20 and an intermediate inner radial surface portion 26B3 positioned, along the first central axis X20, between the inner radial surface portions 26B1 and 26B2. The faces 24A and 24B protrude radially from the rest of the body 20. In other words, the rest of the body 20 positioned longitudinally on either side of the outer flange ring 22 has an outer diameter smaller than the diameter of the outer radial surface 26A of the outer flange ring 22. The intermediate inner radial surface portion 26B3 has a diameter d34. The diameter d34 is larger than the diameter d22 of the front and rear inner radial surface portions 26B1 and 26B2, which is common. The diameter d22 is smaller than the inner diameter d20 of the body 20 behind the rear inner radial surface portion 26B2 and is equal to the diameter d6, to within any radial play. A transition zone T22 is defined as being a frustoconical part centered on the first central axis X20 behind the inner radial surface 26B.

The front axial face 24A and the rear axial face 24B are annular surfaces, parallel to one another and perpendicular to the first central axis X20.

The outer flange ring 22 bears an obstacle 28 that is mounted gripped in a radial bore arranged in the outer flange ring 22 and that extends radially centrifugally relative to the first central axis X20 past the outer radial surface 26A of the outer flange ring 22. The obstacle 28, visible in FIGS. 1 and 2, here is a pin, which is blocked relative to the body 20, in particular the obstacle 28 is blocked in rotation relative to the body 20 about the first central axis X20.

A front sealing gasket 30A, for example a toroidal gasket made from elastomer, is housed in an annular groove centered on the first central axis X20 and arranged in the front axial face 24A, while a rear sealing gasket 30B, for example a toroidal gasket made from elastomer, is housed in an annular groove centered on the first central axis X20 and housed in the rear axial face 24B.

The inner volume V20 emerges on the outside by a mouth 22A, which has a profile flared in the forward direction.

The outer flange ring 22 further has two passages 32 arranged through the outer flange ring 22. Only one of these passages 32 is visible in FIG. 1, while both passages 32 are visible in FIG. 2, along a section plane transverse with respect to the first central axis X20, and in FIGS. 3 and 4, along a median section plane, that is to say, longitudinal and orthogonal with respect to the section plane of FIG. 1.

The two passages 32 pass radially through the outer flange ring 22 and couple the outer radial surface 26A to the inner volume V20. Each of the passages 32 defines an outer volume 32A and a volume of reduced section 32B, which are visible in FIGS. 2 to 4. The outer volume 32A emerges on the outer radial surface 26A of the outer flange ring 22. The volume of reduced section 32B is said to be "of reduced section" because it delimits a maximum passage section smaller than the maximum passage section of the outer volume 32A in an orthoradial plane, that is to say, a plane perpendicular to a direction radial to the first central axis X20, and because the passage section of the outer volume 32A in an orthoradial plane decreases toward the volume of reduced section 32B. The volume of reduced section 32B is radially closer to the first central axis X20 than the outer volume 32A and emerges within the outer flange ring 22 in an annular volume 34 delimited by the intermediate inner radial surface portion 26B3. The annular volume 34 is a cylinder of circular section centered on the first central axis X20, the length of which is denoted L34, measured parallel to the first central axis X20, and the height of which is denoted H34, measured radially with respect to this axis. The height H34 is equal to the difference in diameter d22 of the portions 26B1-26B2, on the one hand, and the diameter d34 of the portion 26B3, on the other hand. The annular volume 34 is arranged in the inner radial surface 26B and extends all the way around the first central axis X20 and the inner volume V20. The outer volume 32A and the associated volume of reduced section 32B are specific to a passage 32, while the annular volume 34 is shared by both passages 32. In other words, each passage 32 emerges in the inner volume V20 by means of the same annular volume 34. The intersection between the annular volume V34 and the inner radial surface portions 26B1-26B2 constitutes the mouth of the passages 32 in the inner volume V20. The two passages 32 are distributed at 180° around the first central axis X20 inasmuch as the two outer volumes 32A, respectively the two volumes of reduced section 32B, are distributed at 180° around the first central axis X20.

Reference l32 denotes the width, measured in a direction parallel to the first central axis X20, of the volume of reduced section 32B emerging in the annular volume 34. In practice, the width l32 is on the order of 2 mm. The length L34 of the annular volume 34 is greater than the width l32 of each volume of reduced section 32B. In practice, the length L34 is greater than the width l32 by a length of between 1 mm and 2.5 mm.

Figure 2:
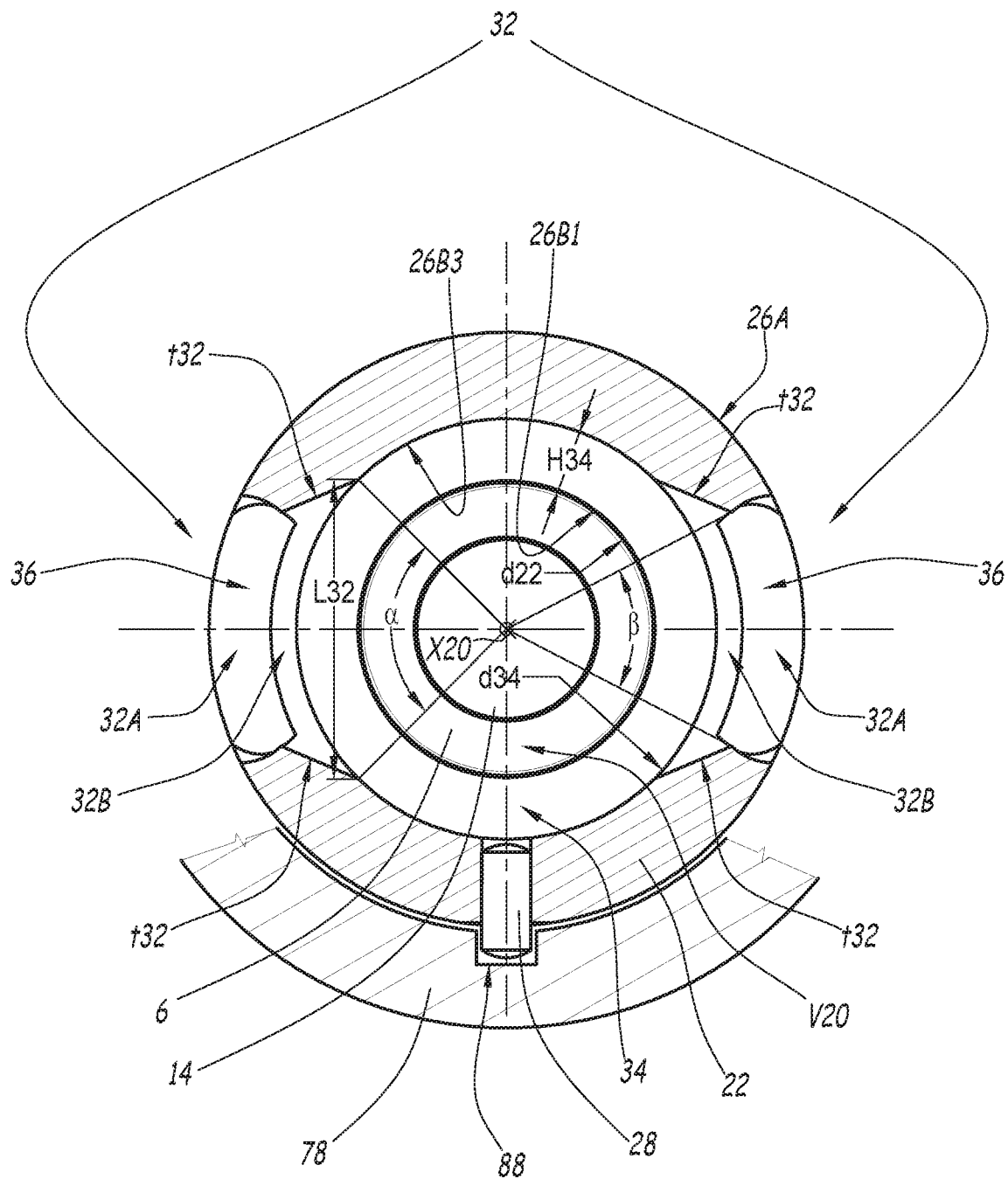
FIG. 2 is a partial cross-section along the broken plane II-II in FIG. 1, of the coupler of FIG. 1, with the addition of a part of a frame associated with the female element.

In section in the plane orthogonal to the first central axis X20 shown in FIG. 2, the walls of each volume of reduced section 32B define two lines t32. The two lines t32 of each passage 32 diverge toward the first central axis X20.

A first angular sector α is defined as being the angle, about the first central axis X20, between the intersections of the lines t32 of a volume of reduced section 32B and the outer radial surface of the annular volume 34, that is to say, the intermediate inner radial surface portion 26B3.

The first angular sector α is wide enough to sweep the entire front face 12A of the body 6 of the male element 2 and the entire front face 14A of the valve 14, as explained later in the present disclosure.

In practice, the first angular sector α is between 45° and 100°. Preferably, the first angular sector α is between 55° and 90°.

An orthoradial dimension L32 of the volume of reduced section 32B is defined as being the maximum length, taken in an orthoradial direction, between the lines t32 of a volume of reduced section 32B. The orthoradial dimension L32 is greater than or equal to 90% of the diameter d22 or of the diameter d6, preferably at least equal to the diameter d22 or the diameter d6, the diameter d22 being equal to 15 mm in the example.

For a given volume of reduced section 32B, the width l32 is at least two times smaller than the orthoradial dimension L32, preferably at least five times smaller than the orthoradial dimension L32. The flow of pressurized air coming from the inlet orifice 86 is thus concentrated along a plane orthogonal to the first central axis X20.

An angular sector β is also defined as being the angle, about the first central axis X20, between the intersection of the lines t32 of a volume of reduced section 32B and the adjacent outer volume 32A. In practice, the second angular sector β is between 45° and 65°, preferably on the order of 55°.

In light of the divergent nature of the lines t32 toward the first central axis X20, the first angular sector α has a value greater than that of the second angular sector β.

Figure 3:
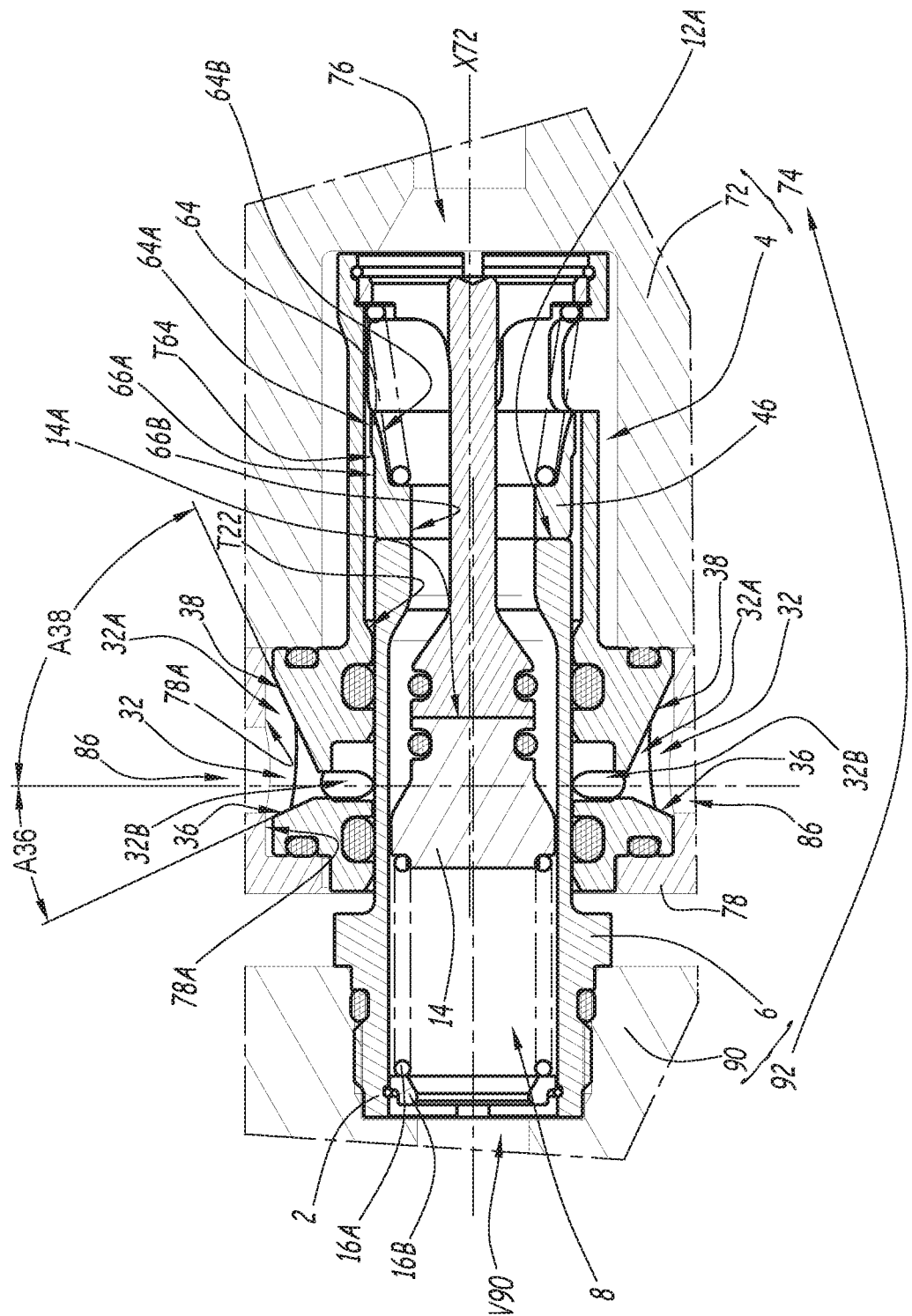
FIG. 3 is a sectional view of a subassembly according to the invention and comprising the coupler of FIG. 1 in the coupled configuration, according to a longitudinal section plane of the coupler, orthogonal to the plane of FIG. 1.
Figure 4:
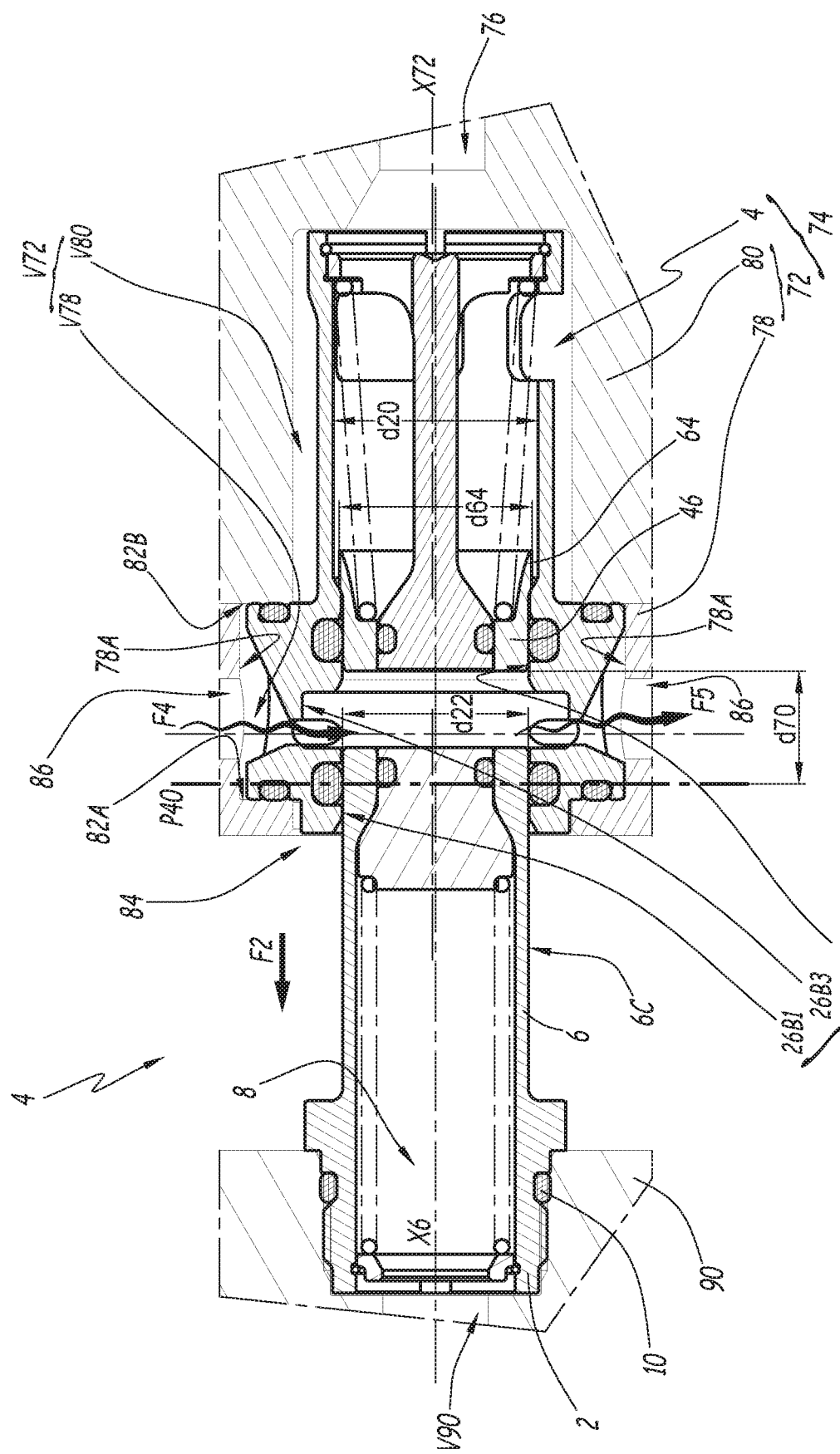
FIG. 4 is a sectional view similar to FIG. 3, the coupler being shown in an intermediate uncoupled configuration.

Each outer volume 32A has a distal or front surface 36 and a proximal or rear surface 38, which are visible in FIGS. 3 and 4. The distal surface 36 and the proximal surface 38 of an outer volume 32A are inclined relative to a plane orthogonal to the first central axis X20 and converge toward the first central axis X20.

An angle A36 is defined as being the angle between the line of the distal surface 36 in the median plane of the volume of reduced section 32B radial to the first central axis X20 and an axis radial to the first central axis X20 and contained in the median plane; an angle A38 is also defined as being the angle between the line of the proximal surface 38 in the median plane of the volume of reduced section 32B and an axis radial to the first central axis X20 and contained in the median plane.

The proximal surface 38 is more inclined than the distal surface 36, that is to say, the angle A38 is greater than the angle A36.

In practice, the angle A38 is on the order of 65°, while the angle A36 is on the order of 25°. Advantageously, the sum of the angle A38 and the angle A36 is equal to 90°, an outer volume 32A having a proximal face 38 orthogonal to its distal face 36 being easier to machine than an outer volume with another angle, in particular by milling.

As shown in FIG. 2, the radial bore bearing the pin 28 extends perpendicular to a plane of symmetry of the passages 32 that is radial to the first central axis X20.

A distal groove 40, in which a distal sealing gasket 40A is housed, for example an O-ring made from elastomer, is arranged radially in the inner radial surface 26B, more specifically in the front inner radial surface portion 26B1. The distal groove 40 is located longitudinally with respect to the first central axis X20 between the annular volume 34 and the mouth 22A.

A proximal groove 42, in which a proximal sealing gasket 42A is housed, for example an O-ring made from elastomer, is arranged radially in the inner radial surface 26B, more specifically in the rear inner radial surface portion 26B2. The proximal groove 42 and the distal groove 40 are located on either side of the annular volume 34 along the first central axis X20. The distal sealing gasket 40A and the proximal sealing gasket 42A are thus located on either side of the annular volume 34 along the first central axis X20. The distal sealing gasket 40A is located in front of each of the passages 32 in the direction where the distal sealing gasket 40A is positioned in a front part of the body 20 that is delimited longitudinally by the passages 32. Thus, the distal sealing gasket 40A is located in front of the mouth of each of the passages 32 in the inner volume V20. The proximal sealing gasket 42A is located behind each of the passages 32 in the direction where the proximal sealing gasket 42A is positioned in a rear part of the body 20 that is delimited longitudinally by the passages 32. Thus, the proximal sealing gasket 42A is located behind the mouth of each of the passages 32 in the inner volume V20.

Each of the distal groove 40 and proximal groove 42 has a bottom and two side walls. A median plane P40 of the distal groove 40 is defined as being a plane orthogonal to the first central axis X20, passing through the middle of the bottom of the distal groove 40 and a median plane P42 of the proximal groove 42 is defined as being a plane orthogonal to the first central axis X20, passing through the middle of the bottom of the proximal groove 42. The distal groove 40 and the proximal groove 42 are positioned in the body 20 such that their respective median planes P40 and P42 are located, along the first central axis X20, between the surfaces 24A and 24B.

The female element 4 further includes a central plunger 44, a slide valve 46 and a second spring 48.

The central plunger 44 comprises a base 50, a head 52 and an elongated rod 54, the rod 54 being aligned in its length on the first central axis X20 and being coupled to a rear end of the base 50 and a front end of the head 52.

The central plunger 44 is kept in the inner volume V20 by a stop segment 60 blocking the base 50 along the first central axis X20. The head 52 has a shape of revolution about the first central axis X20 and defines an outer peripheral surface 56 and a front face 58. A gasket 62, for example an O-ring made from elastomer, is housed in a groove arranged radially in the outer peripheral surface 56.

The slide valve 46 is movable along the first central axis X20 between a forward closed position in which the slide valve 46 cooperates tightly with the body 20 and the central plunger 44 and closes a rear part of the inner volume V20, and a withdrawn position of the rear part of the inner volume V20.

The slide valve 46 has a shape of revolution about the first central axis X20 and comprises a rear skirt 64, an outer radial face 66A, an inner radial face 66B and a front face 68.

The rear skirt 64 has an outer surface 64A and an inner surface 64B, the inner surface 64B diverging toward the rear, while the outer surface 64A is cylindrical with a circular section and has a diameter d64. In particular, the diameter d64 of the rear skirt 64 is less than or equal, to within any assembly play, to the inner diameter d20 of the inner volume V20, but greater than the diameter d22. An inclined face T64 is defined as being the inclined surface relative to the first central axis X20 located at the junction between the outer surface 64A of the rear skirt and the outer radial face 66A of the slide valve 46.

Under the effect of the second spring 48, which bears jointly on the base 50 of the central plunger 44 and on the slide valve 46, the slide valve 46 is pushed back in the forward direction and the inclined face T64 abuts against the transitional zone T22 of the body 20.

When the slide valve 46 bears against the body 20, the outer radial face 66A of the slide valve 46 cooperates tightly with the proximal gasket 42A, in other words, the proximal sealing gasket 42A is radially inserted between the slide valve 46 and the body 20 and the slide valve 46 cooperates tightly with the body 20 by means of the gasket 42A, while the inner radial face 66B of the slide valve 46 cooperates tightly with the gasket 62 of the central plunger 44.

This configuration of the female element 4 corresponds to the closed position of the slide valve 46, visible in FIGS. 1 and 4.

In this closed position, the front face 68 of the slide valve 46 and the front face 58 of the central plunger 44 are advantageously flush and positioned behind the mouth of the passages 32 in the inner volume V20. The front face 68 of the slide valve 46 and the distal sealing gasket 40A are positioned longitudinally on either side of the passages 32, while the distal sealing gasket 40A is located in front of the passages 32. Thus, the passages 32 emerge in the inner volume V20 between the proximal sealing gasket 42A and the distal sealing gasket 40A and fluid communication is possible between the two passages 32 through the inner volume V20.

An axial distance d70 is defined, visible in FIG. 4, as being the length, measured parallel to the first central axis X20, between the median plane P40 and the front face 68 of the slide valve 46 in the closed position.

In practice, the axial distance d70 is between 8 mm and 40 mm. In the example of the first embodiment shown in FIGS. 1 to 4, the axial distance d70 is equal to 9 mm.

In FIGS. 3 and 4, the female element 4 is assembled to a frame 72. The female element 4 and the frame 72 together form a connection subassembly 74. The frame 72 here is part of an injection mold and delimits an inner duct 76, which forms the end of a cooling circuit through the injection mold. The frame 72 here is formed by a front part 78 and a rear part 80, the front part 78 being secured to the rear part 80 by reversible assembly means, such as screws.

The rear part 80 defines a rear inner housing V80, which is cylindrical with a circular section centered on a longitudinal second central axis X72, while the front part 78 defines another front inner housing V78, cylindrical with a circular section centered on the second central axis X72, of inner diameter greater than the inner diameter of the rear inner housing V80. The inner duct 76 is also centered on the second central axis X72.

The union of the front V78 and rear V80 inner housings defines the inner housing V72 of the frame 72.

The front inner housing V78 is delimited, toward the front, by an annular axial face 82A and emerges toward the rear by an opening 84. Toward the rear, the front inner housing V78 is delimited by an annular axial surface 82B of the front face of the rear part 80, the annular axial surface 82B being coaxial with and facing the annular axial face 82A. The front inner housing V78 is radially delimited by an inner radial surface 78A arranged on the front part 78.

The front part 78 further has two orifices 86.

The two orifices 86 are located at 180° from one another relative to the second central axis X72, extending radially to the second central axis X72, and couple the outside to the inner radial surface 78A of the front part 78. In a variant, the orifices 86 can be inclined relative to the radial direction. A first of the two orifices 86, called "inlet" orifice, is designed to be connected to a pressurized air source, while the second of the two orifices 86, called "outlet" orifice, constitutes a discharge of the pressurized air introduced through the inlet orifice 86.

The path of the pressurized air passing through the inlet orifice 86, then passing through the passage 32 located opposite it and penetrating the inner volume V20, is shown schematically by a wavy arrow F4 in FIG. 4. Similarly, the pressurized air discharged through the outlet orifice 86 is shown schematically by a wavy arrow F5. The orifice 86 located at the top of FIG. 4 here is arbitrarily chosen as being the inlet orifice in order to illustrate the conveyance of the pressurized air. It is thus understood that during the uncoupling operation, the pressurized air coming from the inlet orifice 86 drives any drippings from the outer radial surface 6C of the male element 2, as well as the annular front face 12A and the front face 14A of the valve 14, the drippings being discharged through the outlet orifice 86.

A slot 88 is further arranged longitudinally in the front part 78. The slot 88, visible in FIG. 2, is open on the front inner housing V78.

In FIGS. 3 and 4, the female element 4 is assembled to the frame 72, that is to say, the body 20 is housed in the inner housing V72, the first central axis X20 being parallel to the second central axis X72.

In particular, the outer flange ring 22 is housed in the front inner housing V78 of the front part 78, the front axial face 22A being mounted tightly and sliding over the front annular axial surface 82A by the insertion of the front gasket 30A. Jointly, the rear axial face 24B is mounted tightly and sliding over the rear annular axial surface 82B by the insertion of the rear gasket 30B. When the female element 4 is assembled to the frame 72, the obstacle 28 cooperates with the slot 88 of the frame 72 in the circumferential direction at the first central axis X20 and blocks the rotation of the body 20 relative to the frame 72 about the first central axis X20. The female element 4 is thus freely translated transversely to the second central axis X72 relative to the frame 72, while the outer radial surface 26A of the outer flange ring 22 is not in contact with the inner radial surface 78A of the front part 78. In the example of the figures showing the connection subassembly 74, the outer flange ring 22 is shown in contact with the inner radial surface 78A at the bottom of each figure.

Irrespective of the position of the body 20 in the front inner volume V78, the sealing gaskets 30A and 30B ensure the tightness between the body 20 and the frame 72, and the inner duct 76 communicates with the rear part of the inner volume V20, behind the gasket 62. Owing to the cooperation of the obstacle 28 with the slot 88, the angular orientation of the female element 4 relative to the frame 72 is defined and the outer volume 32A of one of the passages 32 is continuously opposite, in a radial direction with respect to the second central axis X72, one of the orifices 86 arranged through the frame 72. In other words, the obstacle 28 of the female element 4 blocks the rotation of the body 20 relative to the frame 72 about the first central axis X20 in a configuration where each of the orifices 86 is opposite, in a radial direction, at least one of the passages 32.

The orifices 86 have a cylindrical section. The diameter of the orifices 86 is smaller than the longitudinal and orthoradial dimension of the outer mouth of each passage 32, the outer mouth being the closed contour defined by the intersection between the outer volume 32A of a passage 32 and the outer radial surface 26A of the outer flange ring 22.

The male element 2 is mounted tightly on a plate 90, by screwing and insertion of the sealing gasket 10. An end pipe V90 of the cooling circuit is arranged through the plate 90, the end pipe V90 communicating with the inner pipe 8 of the male element 2.

The plate 90 is for example part of a mold slide, which is not shown in the figures. The coupler subassembly 74 and the male element 2 mounted on the plate 90 together belong to a connection installation 92.

Between the uncoupled configuration shown in FIG. 1 and the coupled configuration shown in FIG. 3, the male element 2 is brought closer to the female element 4 following a fitting movement, shown by arrow F1 in FIG. 1, arrow F1 being parallel to the longitudinal axis X6 and oriented toward the front of the male element 2.

The longitudinal axis X6 and the first central axis X20 are generally parallel, but may have alignment flaws on the order of 0.5 mm at most.

While the male element 2 is moved following the fitting movement, the front end 6A of the male element 2 comes back into contact with the mouth 22A of the female element 4. The female element 4 then adapts to the position of the male element 2 by a movement of the outer flange ring 22 in the inner housing V72 of the frame 72, radially with respect to the second central axis X72, until the longitudinal axis X6 and the first central axis X20 are aligned.

The fitting movement continuing, the body 6 of the male element 2 engages in the inner volume V20, the distal sealing gasket 40A comes into contact with the outer radial surface 6C of the male element 2 and the annular frontal face 12A comes into contact with the front face 68 of the slide valve 46. The continued fitting movement results in the slide valve 46 being pushed back into the open position against the resilient force of the second spring 48. At the same time, the front face 58 of the central plunger 44 comes into contact with the front face 14A of the valve 14 and the valve 14 is pushed back into the open position against the resilient force of the return spring 16.

The proximal sealing gasket 42A next comes into contact with the outer radial surface 6C of the male element 2. The proximal sealing gasket 42A participates in fluidly insulating the passages 32 of the inner pipe 8 and the inner duct 76. The outer radial surface 6C of the male element 2 is then jointly in tight contact with the distal sealing gasket 40A and the proximal sealing gasket 42A.

Advantageously, the distal sealing gasket 40A and the proximal sealing gasket 42A are identical to one another. The outer radial surface 6C having a constant outer diameter d6, the inner diameters of the parts of the inner radial surface 26V in which the distal groove 40, in which the distal sealing gasket 40A is housed, and the proximal groove 42, in which the proximal sealing gasket 42A is housed, emerge, are equal.

The coupled configuration of the female element 4 and the male element 2 is reached and corresponds to the configuration shown in FIG. 3.

The connection is said to be quick because it does not require additional tooling, but only bringing the female element 4 and the male element 2 closer by following the fitting movement. In this sense, the coupling R is also called "quick coupling".

While the coupler R is in the coupled configuration, the coolant circulates between the inner duct 76 of the frame 72, the inner volume 20 of the body 20 of the female element 4, the inner pipe 8 of the male element 2 and the end V90 of the cooling pipe of the plate 90.

The valve 14, the central plunger 44, the slide valve 46 and the front end 6A of the male element 2 then bathe in the coolant.

Between the coupled configuration of FIG. 3 and the intermediate uncoupling configuration shown in FIG. 4, the plate 90 is separated from the frame 72 following a movement in the direction opposite the fitting movement, shown by an arrow F2 in FIG. 4, which corresponds to an uncoupling movement.

The inlet orifice 86 is then supplied with pressurized air, which, as long as the slide valve 46 is in the withdrawn open position, passes through the passages 32 and escapes through the outlet orifice 86 via the annular volume 34, bypassing the body 6 of the male element 2. The pressurized air thus sweeps over the outer radial surface 6C of the male element 2 and any drippings of coolant that were not stopped by the proximal gasket 42A. The gaskets 30A and 30B thus form a tight barrier against the pressurized air, which cannot be introduced into the rear inner volume V80 or escape toward the outside of the frame 72 between the frame 72 and the body 20.

According to a sequence that is the opposite of the coupling sequence, the slide valve 46 is pushed back by the second spring 48 into the closed position, the valve 14 is pushed back by the return spring 16A into the closed position, while the male element 2 still cooperates with the distal gasket 40A.

In this configuration, and while the male element 2 continues to withdraw from the female element 4 but stays received in the inner volume V20, the pressurized air coming from the inlet orifice 86 passes through the passages 32 and sweeps over the front face 58 of the central plunger 44, the front face 14A of the valve 14, the annular front face 12A of the male element 2 and the front face 68 of the slide valve 46. The pressurized air also sweeps over the outer radial surface 6C of the male element 2. Thus, any dripping existing on these surfaces is driven by the pressurized air into the outlet orifice 86 and discharged outside the inner volume V20, such that no dripping can pollute the injection surfaces of the mold when the male element 2 is completely removed from the connection subassembly 74. The uncoupling movement is completed with the loss of tightness at the distal gasket 40A. The distal sealing gasket 40A provides, when it cooperates with the outer radial surface 6C, a barrier against the flow of the pressurized air coming from the inlet orifice 86 toward the outside through the mouth 22A and, during the withdrawal movement of the male element 2, a scraping function of the outer radial surface 6C. The supply of pressurized air is then suspended.

The female element 4 and the male element 2 are then ready for a new connection.

Figure 5:
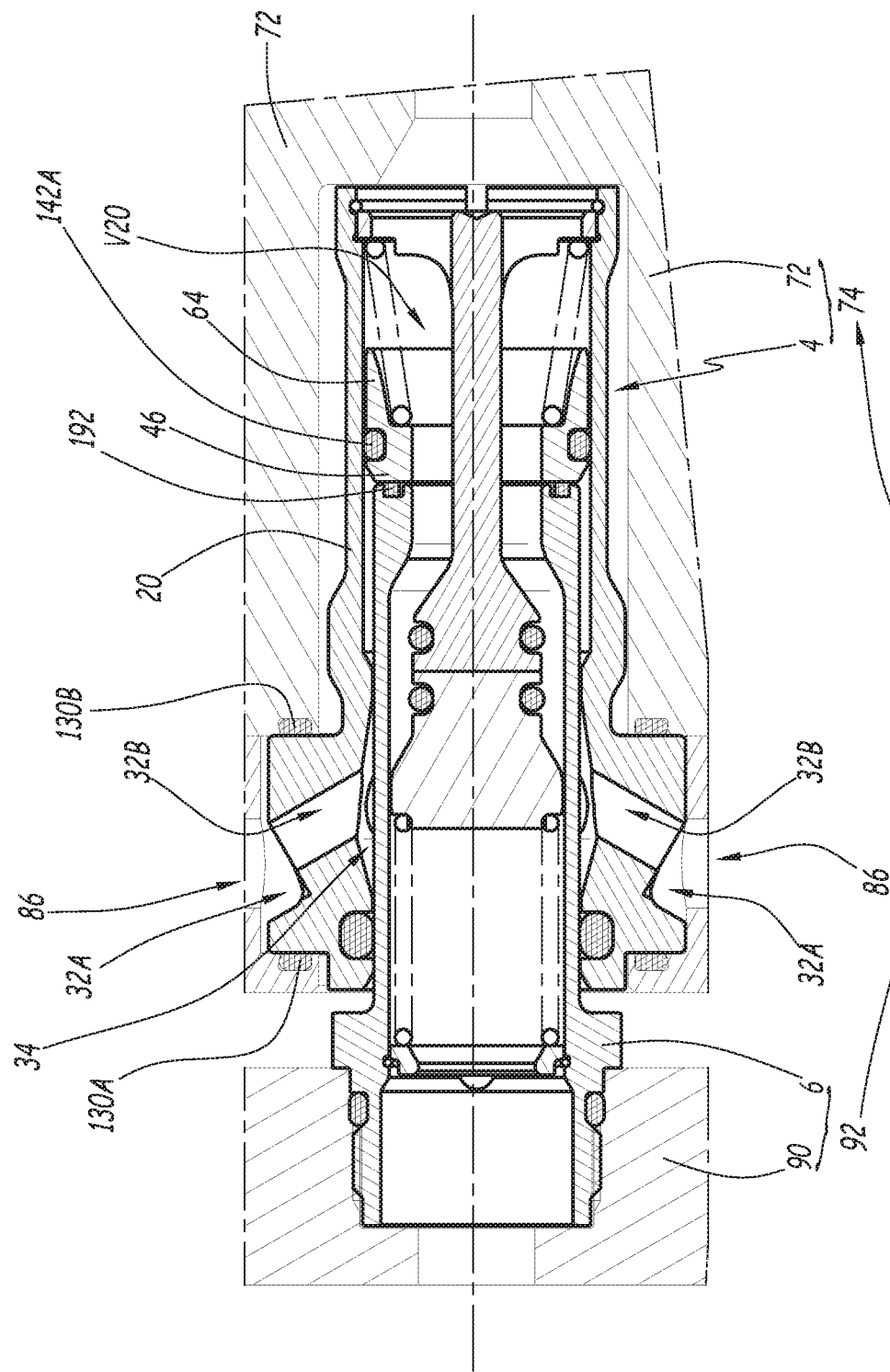
FIG. 5 is a sectional view similar to FIG. 3, of a subassembly also according to the invention and comprising a coupler according to a second embodiment of the invention, in a coupled configuration.
Figure 6:
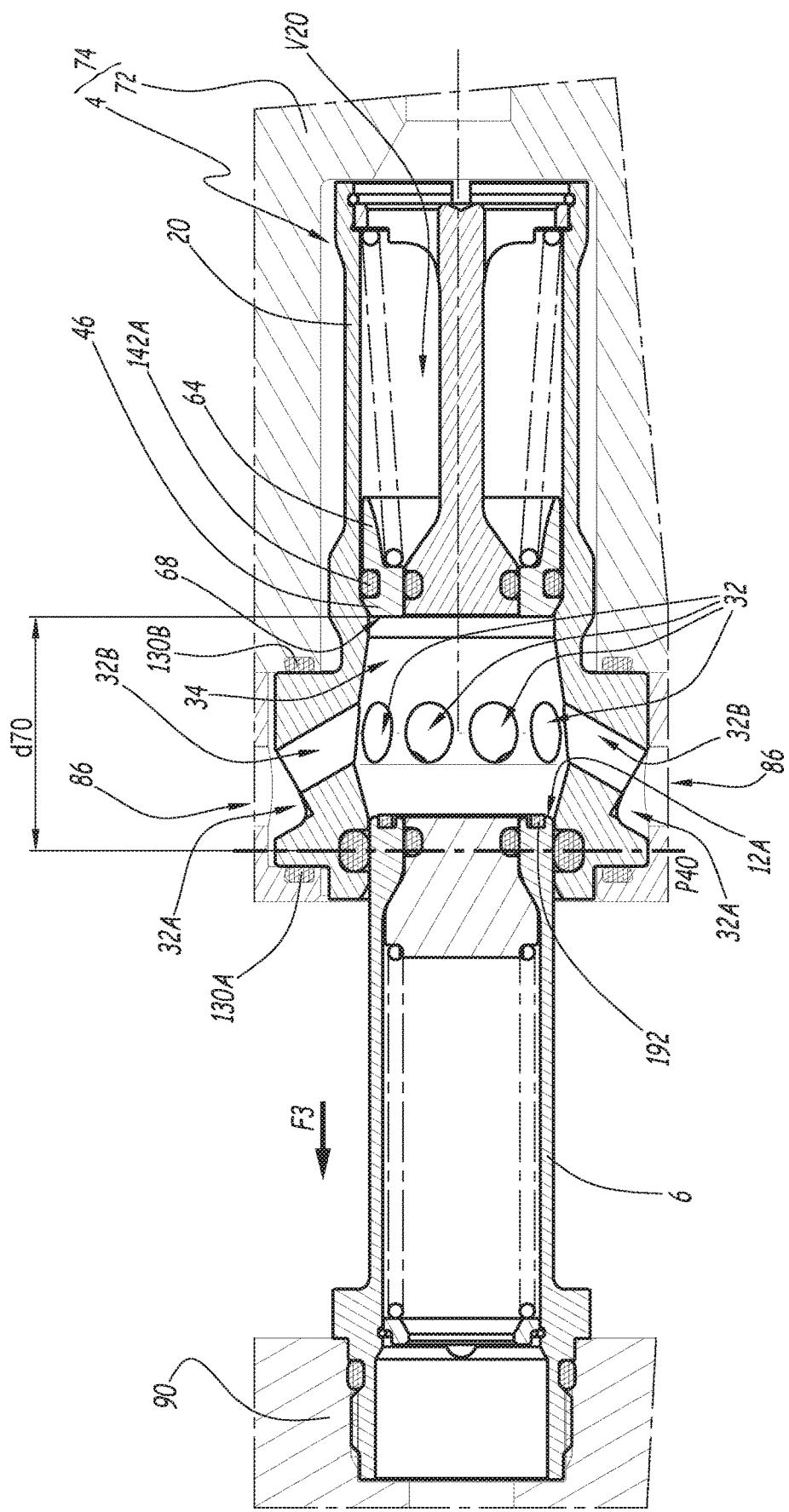
FIG. 6 is a sectional view similar to FIG. 5, the coupler being shown in an intermediate uncoupled configuration.

In the second embodiment of the female element 4 shown in FIGS. 5 and 6, the elements similar to those of the first embodiment bear the same references and work in the same way. Hereinafter, the differences between the first embodiment and the second embodiment will mainly be described.

In this second embodiment, there are ten passages 32. The number of passages 32 can be adjusted based on the needs and the size of the elements 2 and 4 of the coupler R. The passages 32 are distributed, preferably evenly, radially about the first central axis X20 in the outer flange ring 22, one of the passages 32 being situated radially across from a first inlet orifice 86, while another one of the passages 32 is situated radially across from a second outlet orifice 86.

In this second embodiment, the outer volumes 32A of the different passages 32 come together and define a shared peripheral volume, which facilitates the passage of the pressurized air around the outer flange ring 22 irrespective of the position of the outer flange ring 22 in the frame 72.

The volumes of reduced section 32B of the passages 32 each have a cylindrical shape with a circular section, the axis of which is radially inclined relative to the first central axis X20 and converges with the first central axis X20 toward the rear of the female element 4. This incline of the axes of the volumes of reduced section 32B emerging in the annular volume 34 is said to be "sloped" and results in orienting the jets of air passing through the passages 32 toward the front of the male element 2 during the uncoupling, thus increasing the effectiveness of the blowing of the drippings.

The annular volume 34 through which the passages 32 emerge in the inner volume V20 has a more longitudinally elongated shape than in the first embodiment. In particular, the axial distance d70 between the distal groove 40 and the front face 68 of the slide valve 46 in the closed position here is equal to 20 mm.

More generally, the axial distance d70 is adjusted to account for the speed of the uncoupling movement of the male element 2, the uncoupling movement being shown by arrow F3 in FIG. 6. Thus, when the uncoupling speed of the male element 2 is high, a longer axial distance d70 causes the residence time of the male element 2, in particular of the annular front face 12A of the body 6 and of the front face 14A of the valve 14, opposite the annular volume 34 in the radial direction, to be longer. The blowing time of the drippings is thus longer and the cleaning is more effective.

In this second embodiment, the diameter d64 of the rear skirt 64 is equal, to within any assembly play, to the inner diameter d20 of the inner volume V20 and the tightness between the body 20 and the slide valve 46 in the closed position is provided by a sealing gasket 142A, for example an O-ring made from elastomer, which is housed in a groove arranged radially in the outer radial surface of the slide valve 46 and which cooperates tightly with the body 20 behind the passages 32 in the closed position of the slide valve 46.

In the closed position of the slide valve 46, the distal sealing gasket 40A and the front face 68 of the slide valve 46 are positioned longitudinally on either side of the passages 32. In other words, the distal sealing gasket 40A is positioned on one longitudinal side of the mouth of each passage 32 in the inner volume V20, while the front face 68 of the slide valve 46 is positioned on the other longitudinal side of the mouth of each passage 32 in the inner volume V20. Thus, the passages 32 emerge in the inner volume V20 between the gasket 142A and the distal sealing gasket 40A and fluid communication is possible between two passages 32 through the inner volume V20.

In the coupled configuration of the coupler R visible in FIG. 5, the tightness between the body 6 of the male element 2 and the slide valve 46 in the open position is provided by a frontal sealing gasket 192, for example made from elastomer, housed in a groove arranged in the annular front face 12A of the body 6.

The tightness between the front axial face 24A of the outer flange ring 22 and the front annular axial face 82A of the frame 72 is achieved by a front sealing gasket 130A, for example an O-ring made from elastomer, housed in a groove arranged in the front annular axial face 82A of the frame, instead of the front gasket 30A housed in the outer flange ring 22 in the first embodiment.

Similarly, the tightness between the rear axial face 24B of the outer flange ring 22 and the rear annular axial surface 82B of the frame 72 is, in the second embodiment, achieved by a rear sealing gasket 130B, for example an O-ring made from elastomer, housed in a groove arranged in the rear annular axial surface 82B of the frame 72, instead of the rear gasket 30B housed in the outer flange ring 22 in the first embodiment.

Irrespective of the embodiment, for a given shape of the outer flange ring 22, the distal gasket 40A is located as close as possible to the mouth 22A, so that the axial distance d70 is as long as possible. In practice, the distal gasket 40A, as well as the distal groove 40 in which the distal gasket 40A is housed, are aligned with the front axial face 24A of the outer flange ring 22, in that the plane in which the front face 24A extends intersects the groove 40. The effectiveness of the blowing of the drippings is thus maximized for a given bulk of the outer flange ring 22.

In a variant that is not shown, and for all of the embodiments, more than two orifices 86 can be arranged through the frame 72, for example three orifices 86, comprising one inlet orifice 86 and two outlet orifices 86. In the first embodiment, it is then possible to provide three or more passages 32, to provide the circulation of the air within the connection subassembly 74. In all cases, the number of passages 32 is chosen by the designer of the female element 4, to be greater than or equal to two.

In a variant that is not shown, the annular volume 34 of the passages 32 is omitted. The supply of pressurized air of the inlet orifice 86 is then only effective when the slide valve 46 is in the closed forward position.

In a variant that is not shown, for the rotational blocking of the body 20 relative to the frame 72 in a configuration where each of the orifices 86 is radially opposite at least one of the passages 32, an obstacle of the body 20 in the form of a longitudinal slot arranged in a hollow from the outer radial surface 26A of the collar 22 cooperates, in a circumferential direction about the first central axis X20, with a blocking pin fixed in rotation relative to the frame 72 about the second central axis X72. The blocking pin extends radially toward the second central axis X72 from the inner radial surface 78A.

The embodiments and alternatives mentioned above can be combined to provide new embodiments of the invention.

The invention claimed is:

1. A female element of a coupler, the female element being able to be coupled with a male element for the removable fluid junction of two pipes, the female element comprising a body centered on a first longitudinal central axis and defining an inner volume for receiving the male element, a front side and a rear side, the female element further comprising a central plunger longitudinally secured to the body and positioned within the inner volume, as well as a slide valve movable within the inner volume around the central plunger, between a forward closing position, in which the slide valve cooperates tightly with the body and the central plunger, and a withdrawn open position, wherein
the body forms an outer flange ring positioned around the inner volume and having an outer radial surface, a front axial face and a rear axial face, the front axial face and the rear axial face being parallel and annular and protruding radially from the rest of the body,
the outer flange ring comprises at least two passages, each passage being arranged through the outer flange ring and linking the outer radial surface and the inner volume,
a distal sealing gasket is housed in the body at an inner radial surface of the body delimiting the inner volume and
a front face of the slide valve in the closed position and the distal sealing gasket are positioned longitudinally on either side of the passages, while the distal sealing gasket is located in front of the passages.

2. The female element according to claim 1, wherein the female element further comprises a front sealing gasket housed on the front axial face and a rear sealing gasket housed on the rear axial face, the front sealing gasket and the rear sealing gasket being centered on the first central axis.

3. The female element according to claim 1, wherein a median plane of a distal groove housing the distal sealing gasket is positioned longitudinally between the front axial face and the rear axial face of the flange ring.

4. The female element according to claim 1, wherein each passage comprises an outer volume that emerges on the outer radial surface of the flange ring, as well as a volume of reduced section relative to the outer volume, the volume of reduced section being inner relative to the outer volume.

5. The female element according to claim 4, wherein, in section in a plane orthogonal to the first central axis, the volume of reduced section is delimited by walls that are flared and diverge toward the inner volume.

6. The female element according to claim 4, wherein the flange ring comprises two passages that are distributed at 180° about the first central axis and wherein each volume of reduced section covers an angular sector of 45° to 100° about the first central axis.

7. The female element according to claim 4, wherein a width of the volume of reduced section taken along the first central axis is at least two times smaller than an orthoradial dimension of the volume of reduced section.

8. The female element according to claim 1, wherein a proximal sealing gasket is housed in the body in a proximal groove emerging on an inner radial surface portion of equal diameter to an inner radial surface portion on which a distal groove emerges in which the distal sealing gasket is housed and wherein, in the closed position of the slide valve, the proximal sealing gasket is radially interposed between the slide valve and the body.

9. The female element according to claim 1, wherein the body delimits an annular volume by which each passage emerges in the inner volume, a diameter of the annular volume being greater than a diameter of an inner radial surface portion on which a distal groove emerges in which the distal sealing gasket is housed.

10. The female element according to claim 1, wherein the female element comprises an obstacle, blocked in rotation relative to the body about the first central axis and extending radially from the outer radial surface of the flange ring.

11. The female element according to claim 1, wherein the central plunger has a planar front face and wherein the front face of the slide valve and the front face of the plunger are flush when the slide valve is in the forward closed position.

12. A coupler subassembly comprising a frame, wherein the coupler subassembly also comprises a female element according to claim 1, wherein the frame delimits an inner duct and an inner housing, the inner housing defining a second longitudinal central axis parallel to the first central axis, the female element being mounted in the inner housing of the frame with the possibility of movement of the body and the frame radially with respect to the second central axis, with the front axial face of the outer flange ring in tight sliding contact with the frame and the rear axial face of the outer flange ring in tight sliding contact with the frame, while the inner duct of the frame communicates with the inner volume of the female element, the frame delimiting at least two orifices emerging in the inner housing across from the outer flange ring in a direction radial to the second central axis.

13. The coupler subassembly according to claim 12, wherein one of the orifices is connected to a pressurized air source.

14. The coupler subassembly according to claim 12, wherein the female element comprises an obstacle, blocked in rotation relative to the body about the first central axis and extending radially from the outer radial surface of the flange ring, and wherein the obstacle of the female element cooperates with the frame in a circumferential direction with respect to the first central axis in order to block the rotation of the body relative to the frame in a configuration where each of the orifices is across, in a radial direction, from at least one of the passages.

15. A coupler comprising a female element according to claim 1 and a male element that, in the coupled configuration of the coupler, is introduced into the inner volume of the body, an annular front face of the male body pushing the slide valve back into the withdrawn open position, and wherein the distal sealing gasket is in contact with an outer radial surface of the male element in an intermediate uncoupling configuration in which the slide valve is in the forward closed position.

* * * * *